(12) United States Patent
Tkaczyk et al.

(10) Patent No.: US 10,350,716 B2
(45) Date of Patent: Jul. 16, 2019

(54) PIP TRACE HEATING CONNECTION ASSEMBLY

(71) Applicant: TECHNIP FRANCE, Courbevoie (FR)

(72) Inventors: Tomasz Tkaczyk, Westhill Aberdeenshire (GB); Martin Chalmers, Portlethen Aberdeenshire (GB)

(73) Assignee: TECHNIP FRANCE (FR)

( * ) Notice: Subject to any disclaimer, the term of this patent is extended or adjusted under 35 U.S.C. 154(b) by 285 days.

(21) Appl. No.: 15/106,105

(22) PCT Filed: Dec. 19, 2014

(86) PCT No.: PCT/IB2014/003132
§ 371 (c)(1),
(2) Date: Jun. 17, 2016

(87) PCT Pub. No.: WO2015/092545
PCT Pub. Date: Jun. 25, 2015

(65) Prior Publication Data
US 2017/0016565 A1 Jan. 19, 2017

(30) Foreign Application Priority Data
Dec. 20, 2013 (GB) .................................. 1322696.4

(51) Int. Cl.
F24H 1/10 (2006.01)
H05B 3/06 (2006.01)
(Continued)

(52) U.S. Cl.
CPC ............. B23P 19/00 (2013.01); F16L 39/005 (2013.01); F16L 53/38 (2018.01); H05B 3/06 (2013.01);
(Continued)

(58) Field of Classification Search
None
See application file for complete search history.

(56) References Cited

U.S. PATENT DOCUMENTS 3,335,251 A * 8/1967 Rolfes ..................... F24H 1/142
219/630
3,351,738 A 11/1967 Kahn
(Continued)

FOREIGN PATENT DOCUMENTS

CN 203131306 U 8/2013
CN 103363240 A 10/2013
(Continued)

OTHER PUBLICATIONS

Combined Search and Examination Report under Sections 17 and 18(3) dated Jul. 24, 2014 in corresponding United Kingdom Patent Application No. GB1322696.4.
(Continued)

Primary Examiner — Thor S Campbell
(74) Attorney, Agent, or Firm — Ostrolenk Faber LLP

(57) ABSTRACT

A PIP Trace Heating Connection Assembly A pipe-in-pipe (PIP) trace heating connection assembly in the annulus of a PIP pipeline comprising at least first and second conjoined PIP stalks having inner and outer pipes and the annulus thereinbetween, the first PIP stalk having a first trace heating cable (22) located along its inner pipe, and the second PIP stalk having a second trace heating cable (24) located along its inner pipe, the first and second heating cables have cable ends and heating cable terminals on the cable ends, and a flexible intermediate connecting cable (40) having first and second intermediate terminals secured to, the heating cable terminals of the first and second trace heating cables respectively to form a secured electrical pathway between the first and second trace heating cables. In this way, securing the heating cable terminals with the intermediate connecting (Continued)

cable significantly reduces the time required to form a secured electrical pathway between the trace heating cables of each PIP stalk.

19 Claims, 8 Drawing Sheets

(51) Int. Cl.
    *H05B 3/56*     (2006.01)
    *B23P 19/00*     (2006.01)
    *F16L 39/00*     (2006.01)
    *F16L 53/38*     (2018.01)
    *H01R 4/18*     (2006.01)
    *H01R 13/622*     (2006.01)

(52) U.S. Cl.
    CPC ............... *H05B 3/56* (2013.01); *H01R 4/183* (2013.01); *H01R 13/622* (2013.01); *H05B 2214/03* (2013.01)

(56) References Cited

U.S. PATENT DOCUMENTS

| | | | |
|---|---|---|---|
| 3,364,337 A | | 1/1968 | Kahn |
| 3,377,464 A | * | 4/1968 | Rolfes .................. F16L 53/008 138/149 |
| 3,398,262 A | * | 8/1968 | Kahn ...................... F24H 1/142 392/468 |
| 3,446,909 A | * | 5/1969 | Kahn .................... H01B 17/306 174/71 R |
| 4,031,611 A | * | 6/1977 | Johnson, Jr. ............. F16L 59/18 29/611 |
| 4,472,621 A | * | 9/1984 | Blackmore ............. F16L 53/34 392/469 |
| 4,647,127 A | * | 3/1987 | Weingartner .......... H01R 13/28 439/289 |
| 5,137,476 A | * | 8/1992 | Noble ...................... H01R 4/36 439/793 |
| 5,868,589 A | * | 2/1999 | Swenson, Sr. ........ H01H 85/201 337/187 |
| 5,906,513 A | * | 5/1999 | Peterson ................ H01R 9/032 439/320 |
| 6,371,693 B1 | * | 4/2002 | Kopp ...................... F16L 53/37 405/158 |
| 6,495,757 B2 | | 12/2002 | Van Boxstael et al. |
| 6,830,491 B1 | * | 12/2004 | Tomasino ............ H01R 4/5033 439/322 |
| 6,997,758 B2 | | 2/2006 | De Buyst et al. |
| 7,773,867 B2 | * | 8/2010 | Bourget .............. B05C 11/1042 219/221 |
| 7,786,383 B2 | * | 8/2010 | Gumley ................. H01R 4/206 174/84 C |
| 9,843,113 B1 | * | 12/2017 | Campbell .............. H01R 4/302 |
| 2004/0192121 A1 | * | 9/2004 | Tomasino ............ H01R 4/5033 439/784 |
| 2004/0216881 A1 | * | 11/2004 | Hill ........................ E21B 36/04 166/302 |
| 2007/0045275 A1 | | 3/2007 | Steinhauser et al. |
| 2011/0073585 A1 | | 3/2011 | Sinault et al. |
| 2015/0200471 A1 | * | 7/2015 | Melni ...................... H01R 4/56 439/788 |

FOREIGN PATENT DOCUMENTS

| | | |
|---|---|---|
| EP | 0 967 430 A1 | 12/1999 |
| FR | 2 447 626 A1 | 8/1980 |
| GB | 2492883 A | 1/2013 |
| GB | 2494180 A | 3/2013 |

OTHER PUBLICATIONS

Noureddine Laouir, et al., "Heated Pip: Combining Passive Insulation and Active Heating for Enhanced Thermal Performance," OMAE01-4014, 20 International Conference on Offshore Mechanics and Arctic Engineering—OMAE 2001, Rio de Janeiro, RJ Brazil, Jun. 3-8, 2001 (8 pages).

International Search Report dated Jul. 8, 2015 issued in corresponding International patent application No. PCT/IB2014/003132.

* cited by examiner

PIP TRACE HEATING CONNECTION ASSEMBLY

CROSS-REFERENCE TO RELATED APPLICATIONS

The present application is a 35 U.S.C. §§ 371 national phase conversion of PCT/IB2014/003132, filed Dec. 19, 2014, which claims priority to United Kingdom Patent Application No. 1322696.4, filed Dec. 20, 2013, the contents of which are incorporated herein by reference. The PCT International Application was published in the English language.

TECHNICAL FIELD OF THE INVENTION

The present invention relates to a trace heating connection assembly for a multi-pipe pipeline such as a pipe-in-pipe (PIP) pipeline, a PIP pipeline having such an assembly, a flexible intermediate connecting cable, and to a method of connecting trace heating cables of PIP stalks during manufacture.

BACKGROUND OF THE INVENTION

Pipe-in-pipe pipelines, also known as PIP pipelines, are well known in the art, and generally comprise, with reference to the accompanying prior art FIG. 1, an outer pipe 10 (or "carrier pipe") and a usually concentric or co-axial inner pipe or flowline 12. An annular space or "annulus" is defined between the inner and outer pipes. The inner pipe 12 is used to transport or convey fluids such as hydrocarbons, in particular oil and gas, between two or more static and/or moveable locations. This includes conveying fluids between vessels, or locations at or near a seabed such as an oil head, in particular a remote oil head, to an underwater facility and/or to a riser towards sea level, and/or directly to an onshore facility.

However, fluids circulating along deep-water or long tie-back flowlines may experience a significant temperature drop, leading to the risk of hydrate plugging and wax formation, especially in oil and gas flows. PIP pipelines can address the problem of hydrate or wax plugging without having to access the interior of the inner flowline. Active heating is typically implemented by a method known as 'trace heating', whereby electrical cables 14, which may be round or flat cables, are placed in the annular space between the inner and outer pipes to provide heat for maintaining the required temperature level of the fluid inside the flowline or inner pipe. A PIP pipeline with a trace heating arrangement is also known as an ETH-PIP pipeline (electrically trace heated pipe-in-pipe), and can involve flat shaped trace heating cables spiralled against the inner pipe, and under high performance thermal insulation. Electrical power can be fed from either a power umbilical or an Integrated Production Bundle (IPB) to a connection T-piece, located at one end of the ETH-PIP. Optical fibres can be included for real time temperature profile monitoring of the flowline. ETH-PIP pipelines are particularly well suited to long tie-back or heavy oil field applications because of low power consumption, which reduces both OPEX and topside CAPEX costs.

The manufacturing process of ETH-PIP pipelines is very similar to that of PIP pipelines. FIG. 1 shows an onshore manufacturing process in factory-like conditions. Generally, a number of PIP stalks, typically 1 to 1.5 km long, are assembled by insertion of the inner flowline inside the outer pipes. FIG. 1 shows a typical spoolbase layout for manufacturing an ETH-PIP, with the trace heating cables 14 being added to the flowline 12, which is then aligned with the insertion process into the outer or carrier pipe 10 to form a PIP stalk 16. Each PIP stalk 16 can then be joined with earlier PIP stalks already spooled onto a vessel, such as a reel lay vessel 18.

The process of joining two PIP stalks 16 together, sometimes termed a 'tie-in', begins with welding two inner flowlines 12 together. Then, the trace heating cables 14 and any fibre optic lines around the flowlines 12 of each PIP stalk 16 need to be connected. Currently, this connection process is carried out by directly splicing the cables 14 together. This is a time consuming process, generally taking at least 4 hours per cable. Where there are 3, 4 or more cables to be connected, it is appreciated that this can be a significant time requirement in the pipeline manufacture, which must occur for each tie-in process being carried out.

SUMMARY OF THE INVENTION

It is an object of the present invention to provide a quicker method and assembly of joining trace heating cables of each stalk during an ETH-PIP manufacturing process.

Thus, according to one aspect of the present invention, there is provided a pipe-in-pipe (PIP) trace heating connection assembly in the annulus of a PIP pipeline comprising at least first and second conjoined PIP stalks having inner and outer pipes and the annulus thereinbetween, the first PIP stalk having a first trace heating cable located along its inner pipe, and the second PIP stalk having a second trace heating cable located along its inner pipe, the first and second heating cables have cable ends and heating cable terminals on the cable ends, and a flexible intermediate connecting cable having first and second intermediate terminals secured to, the heating cable terminals of the first and second trace heating cables respectively to form a secured electrical pathway between the first and second trace heating cables.

In this way, securing the heating cable terminals with the intermediate connecting cable significantly reduces the time required to form a secured electrical pathway between the trace heating cables of each PIP stalk.

The trace heating cables may be those known in the art, generally comprising one or more electrical cores, usually with some core-insulation and one or more outer layers such as tinned-copper or braiding therearound, especially stainless-steel braiding, as a protection against mechanical shocks. The braid can also act as the earth cable to ensure that any damage to the cable does not lead to an exposed live core. For this reason the braid needs to maintain electrical continuity along its length. The braid can also allow carrying out certain electrical tests on a cable.

A typical trace heating cable has a number of cores such as three cores, with a protected stainless-steel braid, and then an outer coating or insulation layer, such as a PVC outer sheath to protect against corrosion.

Thus, according to one embodiment of the present invention, the first and second trace heating cables have cables ends comprising 3 separate cores and a braid as the cable ends.

A PIP stalk may have any number of trace heating cables therearound, generally at least 2, and typically 3, 4, 5 or 6 cables therearound, and typically wound in an S-Z manner known in the art Whilst a PIP stalk may comprise different trace heating cables therealong, typically the trace heating cables are all the same. The trace heating cables can be added to the inner pipe or flowline of a PIP stalk in the manner known in the art. This can include the use of spiralling machines which are aligned with the flowline insertion process into the outer pipe or carrier pipe.

The heating cable terminals of the connection assembly of the present invention may be added to the cable ends either during the tie-in steps of joining 2 PIP stalks, or earlier in the manufacturing process. Where added earlier, this can be an 'offline' process, further reducing the overall time required for the tie-in of 2 PIP stalks.

Thus, according to another embodiment of the present invention, the connection assembly of the present invention comprises a first trace heating cable having cable ends pre-formed with heating cable terminals, and a second trace heating cable having cable ends pre-formed with heating cable terminals.

The cable terminals can be added or secured to the cables ends using any suitable method or process, generally requiring securement thereinbetween and a continuous electrical pathway.

Optionally, each cable end, either being a core or a braid, is exposed from its insulation, and a heating cable terminal is added therearound and secured thereto, through one or more securements such as bolted connections, soldering, crimping or a combination of same. Preferably, an insulation cap is then located around the conjoining of the heating cable terminal and the cable end, which gap extends to the insulation surrounding the remainder of the cable, so as to provide insulation between the trace heating cable and the cable terminal.

Optionally, an insulation sleeve is added between the trace heating cable and each heating cable terminals. This provides electrical insulation, and some structural support to the connection created between the cable ends and the heating cable terminals.

The flexible intermediate connecting cable may have any suitable shape, design, size or pattern, and will generally have the same number of intermediate terminals at each end as the number of heating cable terminals at the end of each trace heating cable.

The flexible intermediate connecting cable may be secured directly to the cable ends of the first and second trace heating cables. The securing may be by any suitable securement or securing means, able to conjoin or couple the terminals together to form the required electrical pathway with sufficient efficiency, with no concern thereafter for any electric shorting or physical parting. The skilled man is aware of various means for achieving such securement. For example, various quick fit connectors, or telescopic connection, where one tube is inserted into another until the cables are tight. The keys requirements are cable tightening, being able to withstand the axial load.

In one embodiment of the present invention, the heating cable terminals have first threaded portions, and the intermediate terminals have complementary threaded portions, wherein the first threaded portions of the heating cable terminals are securable with the threaded portions of the intermediate terminals to form a secured electrical pathway between the first and second trace heating cables.

In another embodiment of the present invention, the connection assembly further comprises connectors between the heating cable terminals and the intermediate terminals.

The purpose of the connection being threaded is to allow the two terminations to be pulled together and tightened by simply rotating the connection. A threaded connection also allows the joint to withstand line tension.

The connectors may have size, shape or design. They may be integrally formed as part of the flexible intermediate connecting cable, or formed separately and added to the flexible intermediate connecting cable either prior to or during securing of the heating cable terminals and the intermediate terminals together to form these secured electrical pathway between the first and second trace heating cable. Preferably the connectors are pre-formed or formed 'off line', ready for immediate use during the connection assembly.

Preferably, the heating cable terminals have first threaded portions, the intermediate terminals have second threaded portions, and the connectors have third threaded portions complementary to the first and second threaded portions.

In this way, the heating cable terminals and the intermediate terminals can be secured together via the third threaded portions of the connectors.

According to a further embodiment of the present invention, the heating cable terminals have first threaded male portions, the intermediate terminals have second male threaded portions and the connectors have third female threaded portions.

Optionally, the threaded portions have any relationship respectively, such as male-female, female-male, or any combination of same, including differing male-female relationships between different cable terminals from different trace heating cables.

According to third embodiment of the present invention, the third female threaded portions of the connectors for the heating cable terminals are threaded reversely to the third female threaded portions of the connectors for the intermediate terminals. That is, the third female threaded portions of the connectors comprise a first threaded section to engage the heating cable terminals, and a second reverse threaded section to engage the intermediate terminals.

In this way, rotation of the connectors once initially coupled with the heating cable terminals and the intermediate terminals leads to the bringing together of the heating cable terminals and the intermediate terminals within the connectors, thereby leading to greater securement thereinbetween, and reducing, preferably minimising, any slack in the intermediate connecting cable between the heating cable terminals of the first trace heating cable, and the heating cable terminals of the second trace heating cable.

Alternatively, the first male threaded portions and the second male threaded portions are threaded reversely, in comparison with the third female threaded portions of the connectors, such that again the rotation of the connectors serves to draw together the heating cable terminals and the intermediate terminals together in a single motion or action.

Optionally, the connection assembly of the present invention further comprises one or more protective sheaths around the connectors and the heating cable terminals and the intermediate terminals once secured together.

According to another embodiment of the present invention the connection assembly further comprises one or more protective sleeves therearound after the heating cable terminals of the first and second heating cables are secured to the first and second intermediate terminals respectively to form the secured electrical pathways between the first and second trace heating cables.

Optionally, the connection assembly further comprises an outer sleeve extending from the first heating cable to the second heating cables and enclosing the connection assembly thereinbetween.

The intermediate connecting cables are flexible, such that they can be conveniently located between the first heating cable on the first PIP stalk, and the second trace heating cable on the second PIP stalk. Commonly, the cable ends of the first and second trace heating cables are not directly aligned, and indeed by being added in a spiral winding around the PIP stalks, they commonly also have a rotational dislocation between the cable ends. By being flexible, the flexible intermediate connecting cable of the present invention can provide the required rotational and/or longitudinal realignment required between the cable ends of the first and second trace heating cables.

Optionally, the connection assembly is able to provide electrical heating to the inner pipe across the join of the first and second PIP stalks The present invention can also be looked at as a pipe-in-pipe (PIP) trace heating connection assembly between a first trace heating cable having cable ends of a first PIP stalk, and a second trace heating cable having cable ends of a second PIP stalk, the connection assembly comprising heating cable terminals locatable on the cable ends, and a flexible intermediate connecting cable having first and second intermediate terminals, wherein the heating cable terminals of the first and second heating cables are securable to the first and second intermediate terminals respectively to form a secured electrical pathway between the first and second trace heating cables.

According to another aspect of the present invention, there is provided a flexible intermediate connecting cable as defined herein, and threaded connectors to secure the first and second intermediate terminals of the intermediate connecting cable to the heating cable terminals of the first and second trace heating cables, for use in a pipe-in-pipe (PIP) trace heating connection assembly as also defined herein to form a secured electrical pathway between the first and second trace heating cables. That is, a flexible intermediate connecting cable and connectors for a pipe-in-pipe (PIP) trace heating connection assembly between a first trace heating cable having cable ends of a first PIP stalk, and a second trace heating cable having cable ends of a second PIP stalk, the cable ends having heating cable terminals, the flexible intermediate connecting cable comprising first and second intermediate terminals at each end of the cable, and wherein the heating cable terminals have first threaded portions, the intermediate terminals have second threaded portions and the connectors have third threaded portions complementary to the first and second threaded portions, such that the heating cable terminals of the first and second trace heating cables are securable via the connectors to the first and second intermediate terminals respectively to form a secured electrical pathway between the first and second trace heating cables.

Optionally, the user is provided with a series of flexible intermediate connecting cables of different lengths, which can therefore be ready to best fit or best match the distance of spacing between the cable ends of the first trace heating cable and the cable ends of the second trace heating cable.

Thus, the present invention also provides a kit of flexible intermediate connecting cables as defined herein having varying lengths Optionally, in the flexible intermediate connecting cable, the heating cable terminals have first male threaded portions, the intermediate terminals have second male threaded portions and the connectors have third female threaded portions complementary to the first and second threaded portions.

Preferably, the third female threaded portions of the connectors for the heating cable terminals are threaded reversely to the third female threaded portions for the intermediate terminals.

According to another aspect of the present invention, there is provided a pipe-in-pipe (PIP) pipeline comprising two or more connected PIP stalks, each PIP stalk having at least one trace heating cable therealong, or along its inner pipe, and a trace heating connection assembly as defined herein between the trace heating cables of each PIP stalk to form a secured electrical pathway between the trace heating cables and along the length of the PIP pipeline, i.e. along the length of the inner pipe of the PIP pipeline.

Generally, a PIP pipeline is formed of a number of pipeline stalks or sections, commonly but not limited to each having inner and outer pipeline sections of the same or similar length. The nature and dimensions and other parameters of the inner and outer pipeline sections can differ, generally due to the differing purposes, as is well known in the art.

Subsea PIP pipelines, formed from multiple sections, can be relatively short, such as under 1 km long, or can be up to several kilometers or longer.

Preferably, the PIP pipeline is reelable or towable. Optionally, the PIP pipeline can be installed by any pipelay method, known by the skilled man.

According to another aspect of the present invention, there is provided a method of forming a pipe-in-pipe (PIP) trace heating connection in the annulus of a PIP pipeline comprising at least first and second conjoined PIP stalks having inner and outer pipes and the annulus thereinbetween, the first PIP stalk having a first trace heating cable located along its inner pipe, and the second PIP stalk having a second trace heating cable located along its inner pipe, the method comprising at least the steps of:

(i) providing heating cable terminals onto the ends of the first and second trace heating cables;
(ii) providing a flexible intermediate connecting cable having complementary intermediate terminals; and
(iii) securing the heating cable terminals with the intermediate terminals to form a secured electrical pathway across the join of the inner pipes of the first and second PIP stalks between the first trace heating cable and the second trace heating cable.

That is, a method of forming a pipe-in-pipe (PIP) trace heating connection between a first trace heating cable of a first PIP stalk and a second trace heating cable of a second PIP stalk, comprising at least the steps of:

(i) providing heating cable terminals onto the ends of the trace heating cables;
(ii) providing a flexible intermediate connecting cable having complementary intermediate terminals; and
(iii) securing the heating cable terminals with the intermediate terminals to form a secured electrical pathway between the first trace heating cable and the second trace heating cable.

The nature of the trace heating cables, the heating cable terminals, the flexible intermediate connecting cable, its intermediate terminals, are as discussed hereinabove, and such discussion applies equally to the method of forming a PIP trace heating connection as to the trace heating connection assembly.

Preferably, the method further comprises:

(i) providing the heating cable terminals with threaded portions;
(ii) providing the intermediate terminals with complementary threaded portions; and
(iii) securing the threaded portions of the heating cable terminals with the threaded portions of the intermediate terminals to form a secured electrical pathway between the first trace heating cable and the second trace heating cable.

The use of threaded portions provides a quick and simple method of securing the heating cable terminals and the intermediate terminals together without the need for splicing and any soldering or welding to form a secured connection. Moreover, the use of threaded portions also assists in withstanding axial tension in the PIP pipeline particularly during its laying in the sea, especially towards a seabed.

Preferably, the heating cable terminals can be provided onto the ends of the trace heating cables during stalk fabrication, and hence off the critical path, and prior to a tie-in for connecting to PIP stalks.

According to another embodiment of the present invention, where the flexible intermediate connecting cable comprises first and second intermediate terminals at each end of the cable, and where the heating connection further comprises connectors, the method further comprises the step of:

(i) securing the connectors to the first and second intermediate terminals and the heating cable terminals and intermediate terminals respectively to form the secured electrical pathway between the first and second trace heating cables.

In particular, the securing step of the method preferably renders the flexible intermediate connecting cable taut between the first trace heating cable and the second trace heating cable. In this way, any sag or slack in the flexible intermediate connecting cable is reduced and preferably minimised, such that the flexible intermediate connecting cable is tight along the inner pipes of the PIP stalks now joined in the tie-in, and so best placed for the subsequent addition of the insulation therearound prior to conjoining the outer pipes.

Having the cable tight against the surface of the flowline ensures the heat is transferred into the pipe wall most effectively. This ensures that there is not a cold spot in the flowline at the location of the cable connection (should be: at the location where the cable is not in contact with the flowline). If the cable is not able to effectively transfer its heat into the flowline, it is possible it can overheat and degrade.

Preferably, the method further comprises a step of locating one or more protective sleeves around the heating connection once formed. Preferably the sleeve is a heat shrink sleeve around all the connections formed between the first trace heating cable and the second trace heating cable to provide an overall or universal sleeve therearound. The sleeve can form an additional barrier to moisture ingress.

According to one embodiment of the present invention, the method of forming a pipe-in-pipe (PIP) trace heating connection according to the present invention comprises the steps of:

(a) exposing the ends of the first and second trace heating cables into individual core and braid cable ends by removal of heating cable insulation;
(b) installing heating cable terminals with threaded portions onto the exposed cable ends and securing the heating cable terminals and cable ends together;
(c) locating insulation between the heating cable terminals and the remainder of the trace heating cable insulation;
(d) adding a protective sheath around each cable ends leaving exposed the heating cable terminal threaded portions;
(e) providing a flexible intermediate connecting cable having wholly or substantial the length between the heating cable terminals of the first trace heating cable and the heating cable terminals of the second trace heating cable, said flexible intermediate heating cable having cable terminals with threaded portions;
(f) securing connectors having complementary threaded portions with the threaded portions of the heating cable terminals and the intermediate terminals;
(g) rotating the connectors to further engage the threaded portions, and to draw together the heating cable terminals and the intermediate terminals towards each other; and
(h) providing a protective sleeve around the heating connection extending from the first trace heating cable to the second trace heating cable.

According to a further aspect of the present invention, there is provided a method of forming a pipe-in-pipe (PIP) pipeline comprising two or more connected PIP stalks, each PIP stalk having at least one trace heating cable therealong, comprising conjoining first and second PIP stalks and using the method as defined herein for forming a pipe-in-pipe (PIP) trace heating connection between at least a first trace heating cable of the first PIP stalk and at least a second trace heating cable of the second PIP stalk.

BRIEF DESCRIPTION OF THE DRAWINGS

Embodiments of the present invention will now be described by way of example only, and with reference to the accompanying drawings in which.

DESCRIPTION OF PREFERRED EMBODIMENTS

Figure 1:
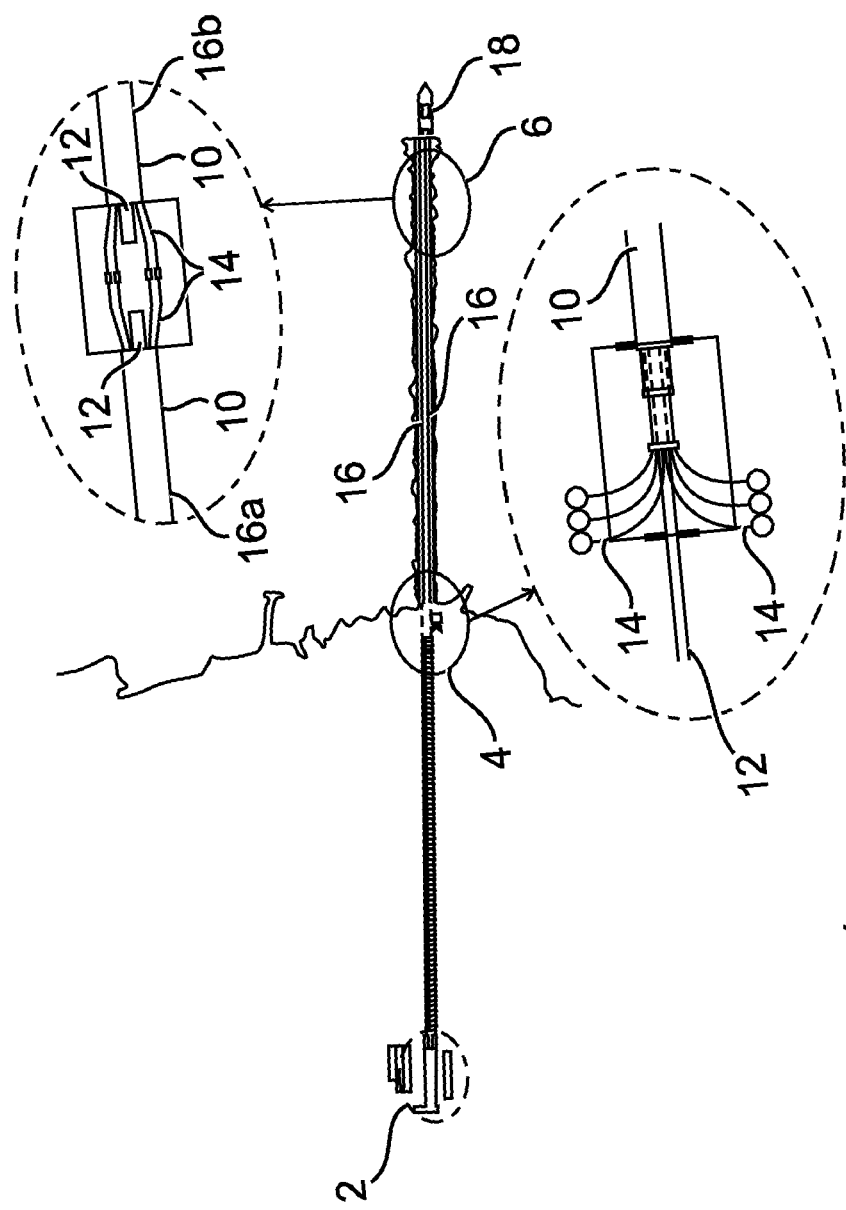
FIG. 1 is a prior art schematic plan of a spoolbase for a PIP assembly.

FIG. 1 is a schematic plan view of a typical spoolbase layout for a PIP construction process, and for reeling onto a lay vessel. From left to right, there is a fabrication building 2 with initial welding stations to form the initial pipe lengths towards a first tie-in station 4, where trace heating cables 14 are added from cable reels around the flowline 12, and insulation is also added along with spacers; prior to insertion of the combination into the outer or carrier pipe 10 and towards the reel lay vessel 18.

Insert G is an enlarged view of a stalk tie-in station 6 for the joining of a newly formed PIP stalk 16a to an existing PIP stalk 16b already mostly reeled onto the vessel 18. Conventionally at the station 6, the two flowlines 12 are first welded together, and then the heating cables 14 are spliced directly together, to join them and so form a continuous electrical connection along the PIP pipeline. Insulation and spacers are then added around the spliced heating cables, followed by joining the carrier pipes 10 together, and reeling the joined PIP stalk 16a onto the vessel 18 (not shown in FIG. 1).

Each trace heating cable splicing operation generally takes at least four hours per cable to carry out Whilst some of this can be carried out simultaneously, the overall time required to splice four trace heating cables together is usually many hours, and is a well known significant slow step in the overall PIP construction process.

Figure 2:
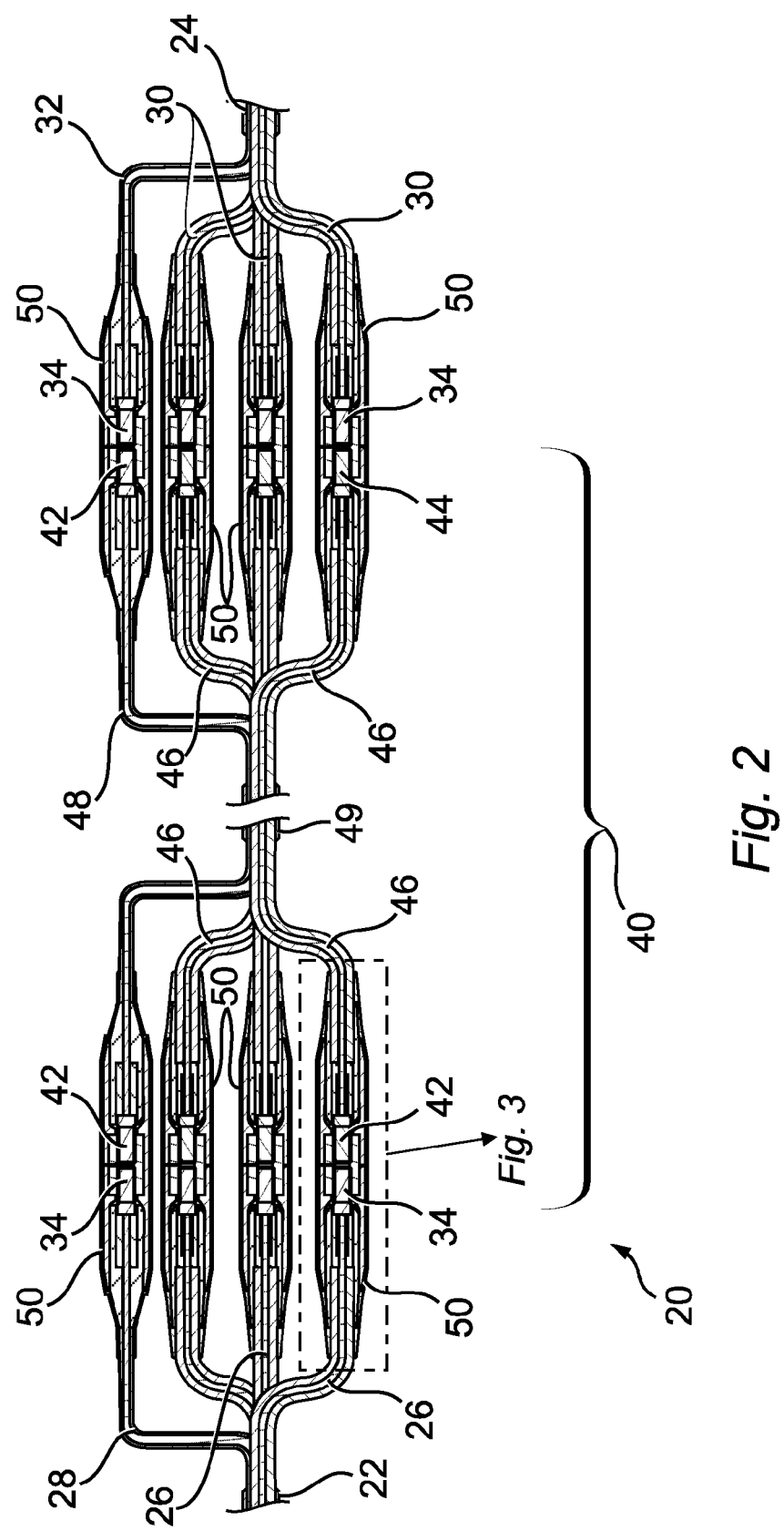
FIG. 2 is a side cross-sectional view of a heating connection according to one embodiment of the present invention.

FIG. 2 is a side cross-sectional view of a pipe-in-pipe (PIP) trace heating connection assembly 20 according to one embodiment of the present invention. The method of providing such an assembly is described in more detail hereafter.

FIG. 2 shows the end of a first trace heating cable 22, and the end of a second trace heating cable 24. The first trace heating cable 22 comprises three electrical cores 26, and a braid 28, each with their own insulation. Each core 26 has been divided out, and the braid 28 also separated, such that there are in effect four cable ends for the first trace heating cable 22. In a similar manner, there are four cable ends for the second trace heating cable 24, comprising three electrical cores 30 and an outer braid 32, which have been separated out as shown in FIG. 2. At the ends of all the cable ends of the first and second trace heating cables 22, 24 are eight heating cable terminals 34 described in more detail hereinafter.

The connection assembly 20 of FIG. 2 also comprises a flexible intermediate connecting cable 40 having first intermediate terminals 42 and second intermediate terminals 44 at its ends. Between six of the first and second intermediate terminals 42 and 44, where the intention is to create a secured electrical pathway between two electrical cores such as 26, 30, there are intermediate electric cores 46; and between the two first and second intermediate terminals 42, 44 intended to provide a pathway between the first and second braids 28, 32, there is an intermediate braid 48. The cores 46 and braid 48 have individual insulation therearound, and optionally a collective outer sheath 49 where they have a common or collective path.

Generally, the intermediate electrical cores and intermediate braid match the electrical cores and braid of the first and second trace heating cables 22, 24, and the electrical parameters and requirements required to ensure secure electrical pathways along the flexible intermediate connecting cable will be known to the person skilled in the art, and these are not described in any further detail herein.

FIG. 2 also shows eight connectors 50 coupling the heating cable terminals 34 with the first and second intermediate terminals 42, 44 in a manner described hereinafter.

Overall, FIG. 2 shows the trace heating connection assembly 20 able to provide a secured electrical pathway between the first and second trace heating cables 22, 24 in a quick and easy arrangement as described hereinafter.

Figure 3:
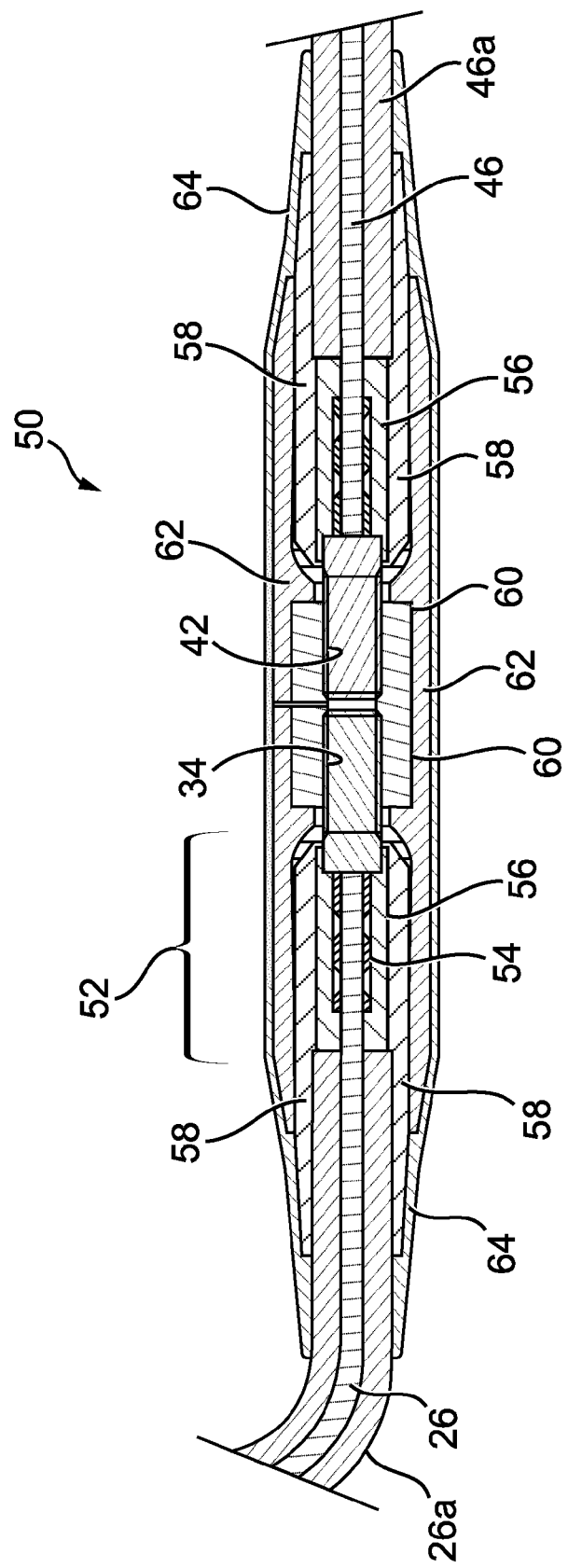
FIG. 3 is side cross sectional enlarged view of a part of the connection assembly of FIG. 2.

A ringed portion of FIG. 2 is shown in enlarged form in FIG. 3.

FIG. 3 shows one electrical core 26 of the first trace heating cable 22, and the insulation 26a therearound, (which insulation 26a separates the electrical core 26 from the other electrical cores and the braid 28 in the first trace heating cable 22 in a manner known in the art). Similarly, FIG. 3 shows the electrical core 46 in one part of the flexible intermediate connecting cable 40, and the insulation 46a therearound in the same manner.

FIG. 3 shows the part of the first trace heating cable 22 that is a cable end 52, with the insulation 26a removed to expose a final portion of the electrical core 26. The heating cable terminal 34 is secured to the exposed electrical core 26. The cable core 26 can be crimped 54 to the terminal 34 as shown, or this connection can be any suitable connection method described hereinafter. An insulation cap 56 is located between the heating cable terminal 34 and the remaining insulation 26a as described hereinafter. Around this cable end 52, extending from the insulation 26a to the beginning of the heating cable terminal 34 is a moulded insulation sheath 58.

FIG. 3 also shows a connector 50 comprising a central metal sleeve 60, (generally made of copper or brass or other conductive metal or alloy), into which the heated cable terminal 34 and the intermediate terminal 42 can be inserted and secured as described hereinafter. The metal sleeve 60 is surrounded by a tubular and open-ended outer sheath 62. Around all the parts shown in FIG. 3 is a final protective heat shrink sleeve 64 that can be applied over the connection once finished, optionally with multiple overlapping layers of sleeves applied with sealing pastes between layers for extra insulation/sealing.

FIGS. 4-17 show various steps and stages in a method of forming a PIP trace heating connection and connection assembly according to an embodiment of the present invention, and using the same reference numerals for the same items as FIGS. 2 and 3.

Figure 4:
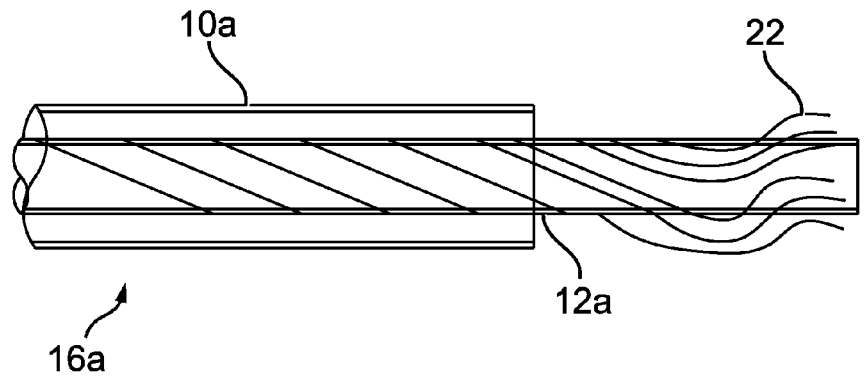
FIGS. 4-17 are steps in a method of forming a PIP trace heating connection according to another embodiment of the present invention.
Figure 16:
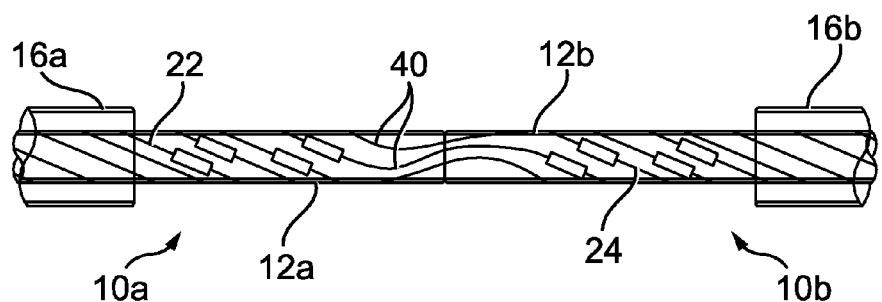
Figure 17:
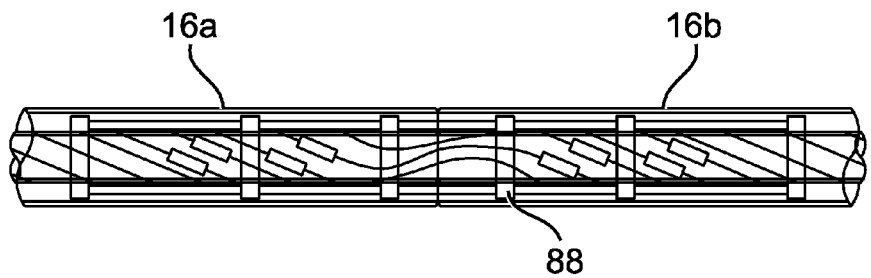

FIG. 4 shows the end of a first PIP stalk 16a that is intended to be conjoined with the end of a second of existing PIP stalk 16b (as shown in FIGS. 16 and 17). The end of the first PIP stalk 16a comprises an outer pipe 10a and an inner pipe or flowline 12a with an annulus therebetween. In the annulus, and around and along the flowline 12a are a number of first trace heating cables 22 in a manner known in the art. The end of the outer pipe 10a has been drawn back to expose the inner flowline 12a for first joining with the inner flowline 12b of the second PIP stalk 16b (shown in FIG. 16, and generally having the same configuration of the first PIP stalk 16a), and to expose the ends of the first trace heating cables 22 for joining to the ends of second trace heating cables 24 around the second inner flowline 12b also shown in FIG. 16.

Figure 5A:
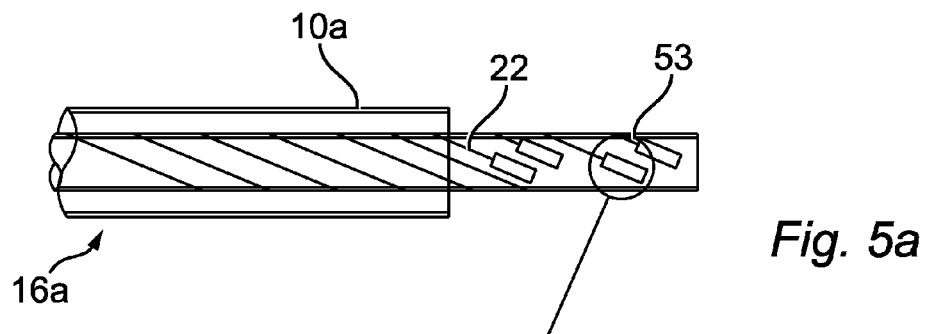
Figure 5B:
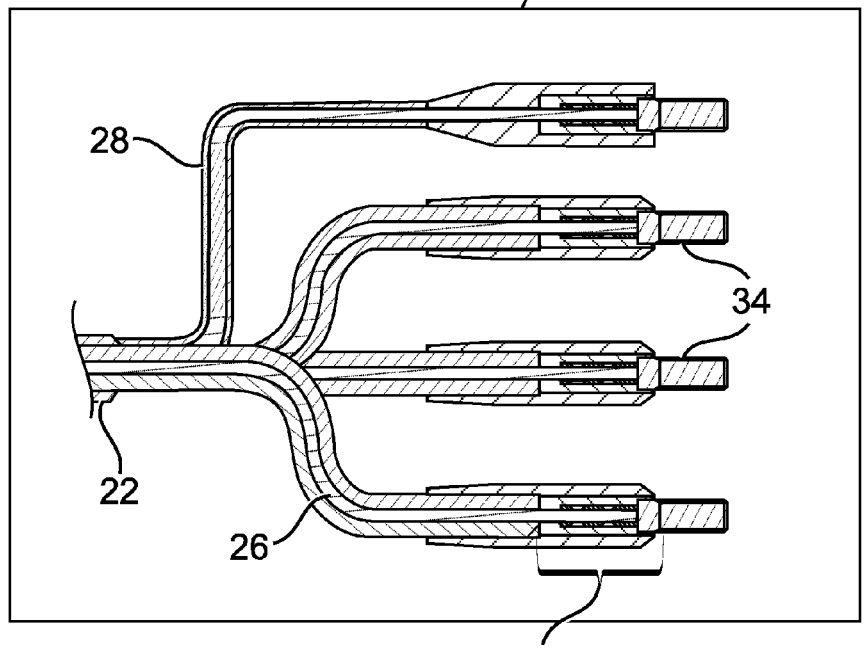

FIG. 5b shows the addition of heating cable terminals 34 to the cable ends 52 of the separated electrical cores 26 and braid 28 of one of the first trace heating cables 22 of FIG. 4, to provide a collective set of cable ends 53 for one trace heating cable 22 as shown in smaller scale in FIG. 5a, ready for use in the present invention.

Figure 6:
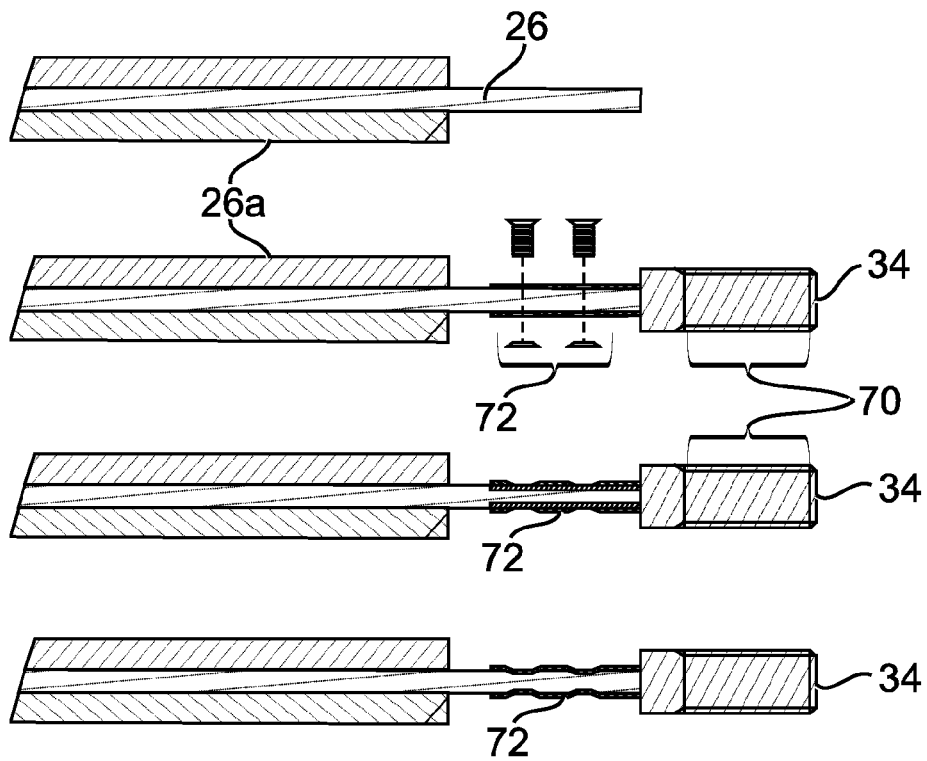

FIG. 6 shows the exposing of an end of one of electrical cores 26 of the first trace heating cable 22 by removal of a portion of the end of the heating cable insulation 26a, and three alternative methods of installing a heating cable terminal 34 onto the exposed core and securing same together. Optionally, the heating cable terminal 34 comprises a male threaded portion 70 and a securing portion 72. The securing portion 72 can be located around the exposed core 26, and either bolted thereto, soldered thereto or crimped thereto, as each shown in FIG. 6. Methods of securing such portions to electrical cores are known in the art, and are not further described herein. The requirements of the present invention in this regard are to ensure a secure electrical pathway therebetween, and sufficient securement to withstand axial tension, either fully or partly, between the trace heating cables.

Figure 7:
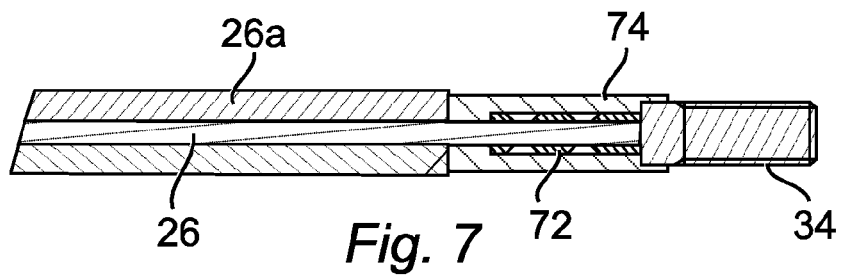

FIG. 7 shows the addition of a protective cap 74 around the connection between the connection portion 72, around a first part of the adjacent heating cable terminal 34, and against the end of the remaining insulation 26a around the electrical core 26.

Figure 8:
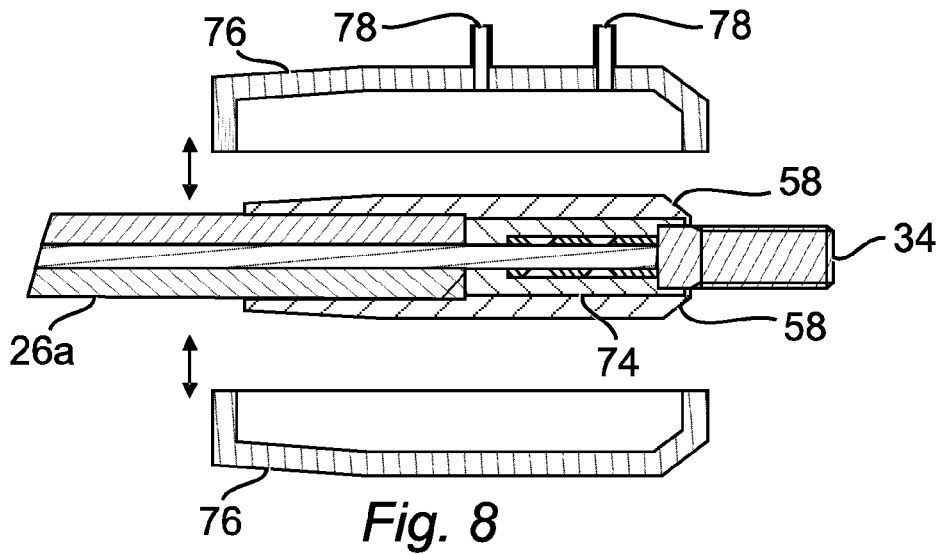

FIG. 8 shows the addition of moulded sheath 58 around the connection between the heating cable terminal 34 and the remaining insulation 26a to provide electrical insulation and some structural support to the connection. The moulded material can be a silicone elastomer, moulded by the use of half shells 76 and the introduction of the elastomer through ports 78 in a manner known in the art.

FIGS. 6-8 show how all the terminals shown in FIGS. 2, 3 and 513 can be created at the exposed end of each electrical core or braid, either in the same or similar way.

Figure 9:
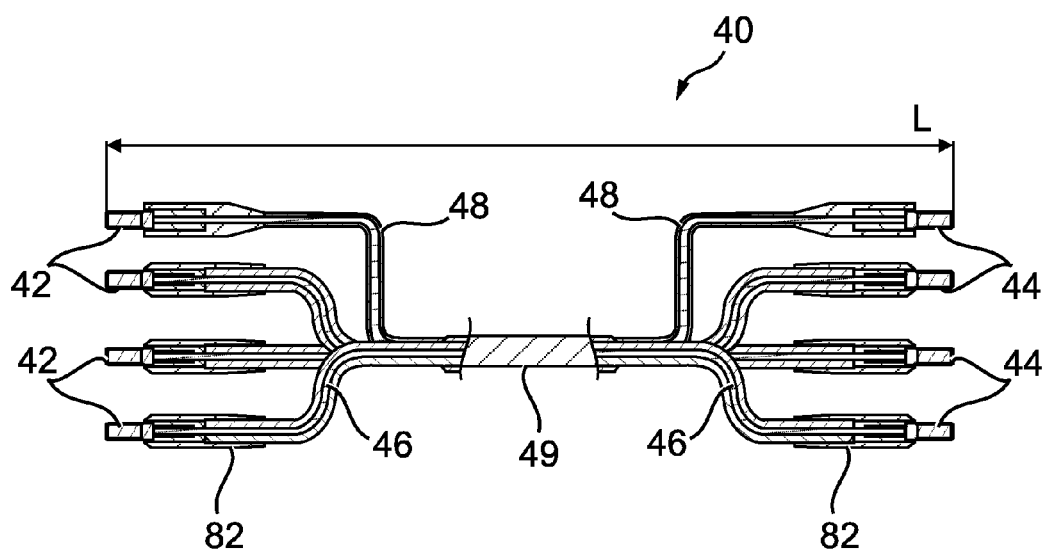

FIG. 9 shows the flexible intermediate connecting cable 40 having the eight intermediate terminals 42, 44, a first set of terminals 42 for matching with the heating cable terminals 34 of the first trace heating cable 22, and a second set of terminals 44 for matching with the heating cable terminals 34 of the second trace heating cable 24. The intermediate terminals 42, 44 are secured onto intermediate braid and electrical cores 46, 48, and have moulded insulation 82 around each connection to provide electrical insulation and some structural support. Their collective path is covered by a collective outer sheath 49.

Figure 10:
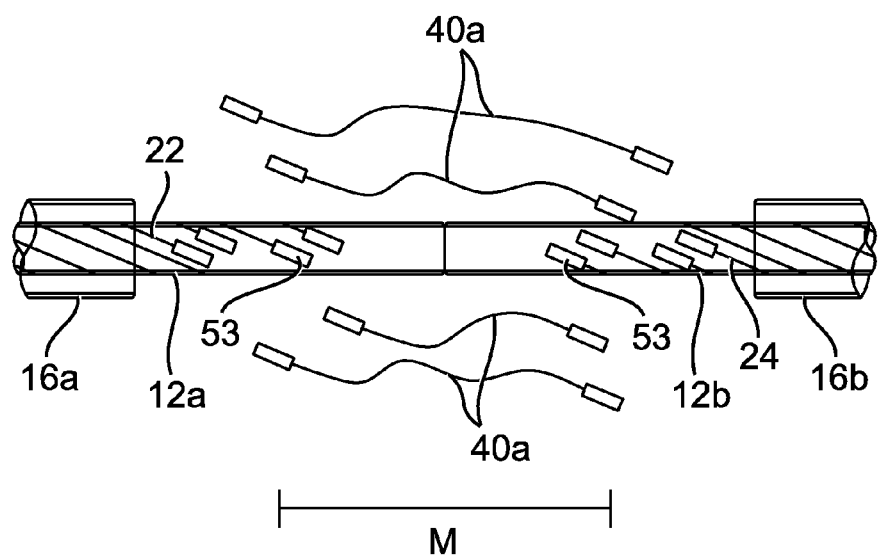

It is a feature of the present invention that the flexible intermediate connecting cable 40 can be made of any length "L": in particular, a series of different lengths by variation of the collective path length. This provides a kit of such cables 40a of varying lengths as shown in FIG. 10. Such cables 40a can be pre-assembled, and then allow the manufacturer to select the best or most appropriate length L to suit the gap or distance "M" that exists between the cable ends 53 of one first trace heating cable 22 and the cable ends 53 of one second trace heating cable 24

It will be appreciated that in the manufacture of PIP stalks, it is difficult to either prejudge or accurately determine the exact gaps or spacings, both in longitudinal distance and in rotational angle, that will exist between the cable ends of the first and second trace heating cables 22, 24 once the PIP stalks get to the tie-in. Thus, the provision of a kit of flexible intermediate connecting cables 40a having variable lengths L allows the manufacturer to select the best cable length L to suit the spacings thereinbetween once known.

Figure 11:
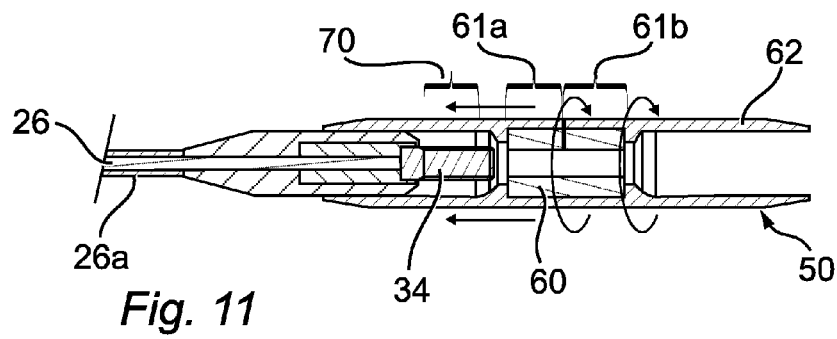

FIG. 11 shows the connection of a connector 50 to a heating cable terminal 34. In the connector 50 is a female threaded metal sleeve 60 surrounded by the tubular outer sheath 62. The threaded sleeve 60 has a first threaded portion 61a, and a second and reverse or opposite threaded portion 61b. The heating cable terminal 34 is inserted into the moulded outer sheath 62 until the threaded portions 70 and 61a meet, following which simple and quick rotation of the connector 50 by grip on the outer sheath 62 increasingly engages the threaded portions in a manner known in the art.

Figure 12:
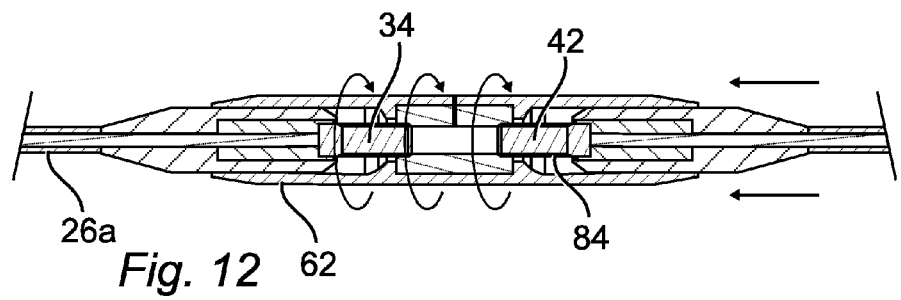
Figure 13:
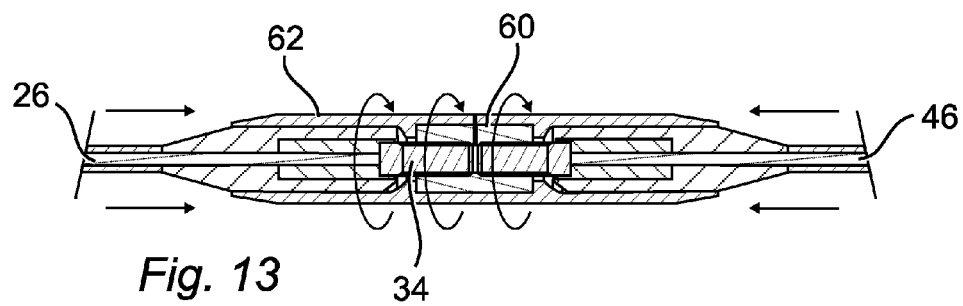

FIG. 12 shows the addition of a intermediate terminal 42 having a male threaded portion 84 complementary to the second female threaded portion 61b of the threaded sleeve 60, such as the same simple and quick rotation of the connector 50 increasingly engages and draws in the male threaded portions 70 and 84 of both the heating cable terminal 34 and the intermediate terminal 84 towards each other, until they are either touching or sufficiently close as shown in FIG. 13 to provide a secure electrical pathway between the electrical cores 26, 46.

The drawing together of the heating cable terminal 34 and the intermediate terminal 42 helps to render taut the flexible intermediate connecting cable 40, thereby reducing and hopefully removing any slack left in the connecting cable 40 between the first and second trace hating cables 22, 24, such that the connecting cable 40 is tightly or snuggly fitting against the inner flowlines 12a, 12b in order to provide the electrical heating effect against the inner flowlines 12a and 12b across their join as described herein.

Figure 14:
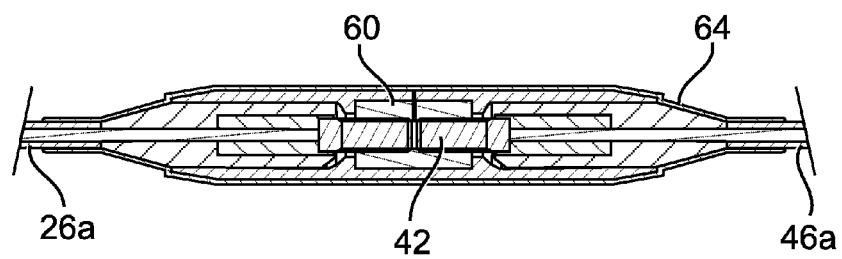

FIG. 14 shows the addition of a protective outer sheath 64 around the heating connection formed in FIG. 13. The outer sheath 64 may be a heat shrink wrap which can be extended back along a suitable length of insulated cables 26a, 46a to create a good seal.

Figure 15:
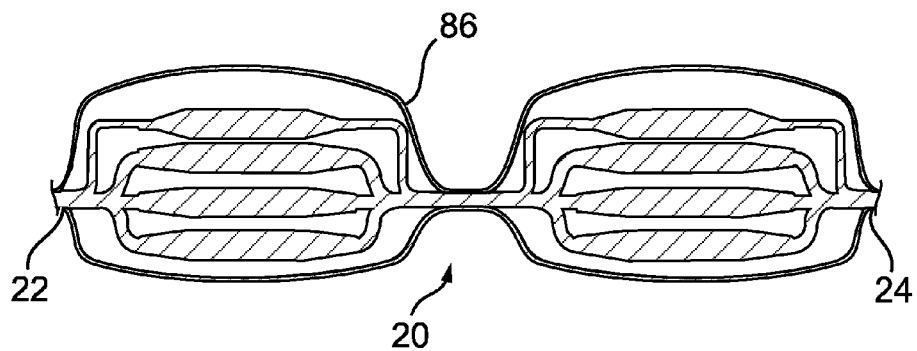

The steps or actions shown in FIG. 11-14 can be repeated for each of the connections shown in FIG. 2 in the same manner, to provide the overall connection assembly 20 shown in FIG. 2. Thereafter, as shown in FIG. 15, a further heat shrink sleeve 86 can be applied around the whole connection assembly 20 for further protection and support.

FIG. 16 shows how each of the four first trace heating cables 22 of the first PIP stalk 16a have been connected to the four second trace heating cables 24 of the second PIP stalk 16b in the around and along the join of the now conjoined inner PIP stalks 12a, 12b, using four flexible intermediate connecting cables 40 and the terminal connections as described hereinabove. Thereafter, thermal insulation can be added around the trace heating cables and their connections, along with spacers 88 shown in FIG. 17, prior to closing and joining of the outer pipes 10a, 10b to form the completed tie-in between the first and second pipe stalks 16a, 16b ready for laying, with electrical heating to the inner pipes 12a, 12b across the join of the first and second PIP stalks 16a, 16b.

The present invention provides a quick connection process between trace heating cables of PIP stalks to be joined, and much of construction can be carried out 'off the critical path' or 'offline', i.e. prior to the actual tie-in station and process. For example, the heating cable terminals can be added to the trace heating cables during an early or earlier manufacturing step, i.e. 'preformed' before the tie-in, and a kit of flexible intermediate connecting cables can also be preformed ready for use.

The present invention provides a faster assembly rate while maintaining electrical continuity and mechanical strength. A particular benefit is that the connections are pre-prepared off the critical path, such that little time is required for the actual connection on the critical path. This allows for significant savings as 'vessel costs' are generally very high in comparison.

The variable length kit of intermediate cables means that the best fitting length can be immediately selected by the manufacturer once the gap or distance between the ends of the trace heating cables at the tie-in are known.

The flexible nature of the flexible intermediate connecting cables allows them to be fitted around the curvature of the inner pipeline, and to be rendered taut so as to reduce and hopefully minimise any slack therein once fully connected.

In total, the only processing steps required by the manufacturer are to insert and rotate the connectors to form the relevant heating and braid connections, along with one or more protective sheath or sleeve additions, which can easily be provided using suitable moulds or heat shrink methods. These process steps are relatively quick and easy to carry out, to provide the overall secured electrical pathway between the first and second trace heating cables that will have assurance through the form of securement, and that will allow rapid subsequent addition of insulation and outer pipe joining.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:
1. A pipe-in-pipe (PIP) trace heating connection assembly in the annulus of a PIP pipeline, comprising:
 at least first and second conjoined PIP stalks having inner and outer pipes and the annulus thereinbetween;

the first PIP stalk including a first trace heating cable located along its inner pipe, and the second PIP stalk having a second trace heating cable located along its inner pipe;

the first and second heating cables include cable ends and heating cable terminals on the cable ends; and a flexible intermediate connecting cable comprising first and second intermediate terminals secured to the heating cable terminals of the first and second trace heating cables, respectively, thereby forming a secured electrical pathway between the first and second trace heating cables, wherein the ends of the first and second trace heating cables are exposed into individual core and braid cable ends by removal of heating cable insulation;

the heating cable terminals comprise threaded portions and are installed onto the exposed cable ends and the heating cable terminals and cable ends are secured together;

further comprising:

insulation positioned between the heating cable terminals and remaining trace heating cable insulation; and a protective cap around each cable end leaves exposed the heating cable terminal threaded portions;

wherein the flexible intermediate connecting cable has a wholly or substantial same length between the heating cable terminals of the first trace heating cable and the heating cable terminals of the second trace heating cable, said flexible intermediate connecting cable comprising cable terminals with threaded portions;

further comprising:

connectors comprising complementary threaded portions secured with the threaded portions of the heating cable terminals and the intermediate terminals, wherein the connectors are rotated to further engage the threaded portions, and to draw together the heating cable terminals and the intermediate terminals towards each other; and a protective sleeve positioned around the heating connection extending from the first trace heating cable to the second trace heating cable.

2. A connection assembly as claimed in claim 1, wherein the connection assembly is tight along the inner pipes of the first and second PIP stalks.

3. A connection assembly as claimed in claim 2, wherein the first and second trace heating cables comprise cables ends comprising three separate cores and a braid as the cable ends.

4. A connection assembly as claimed in claim 2, wherein the first trace heating cable comprises cable ends pre-formed with heating cable terminals, and the second trace heating cable comprises cable ends pre-formed with heating cable terminals.

5. A connection assembly as claimed in claim 1, wherein each heating cable terminal is secured to a cable end, and the insulation cap is located around the conjoining of the heating cable terminal, and the insulation sleeve is positioned between the trace heating cable and the heating cable terminal, wherein the cable end extends to insulation surrounding the remainder of the cable.

6. A connection assembly as claimed in claim 1 wherein the heating cable terminals comprise first threaded portions, and the intermediate terminals comprise complementary threaded portions, wherein the first threaded portions of the heating cable terminals are securable with the threaded portions of the intermediate terminals to form a secured electrical pathway between the first and second trace heating cables.

7. A connection assembly as claimed in claim 1 wherein the heating cable terminals comprise first threaded portions, the intermediate terminals comprise second threaded portions, and the connectors comprise third threaded portions complementary to the first and second threaded portions.

8. A connection assembly as claimed in claim 7 wherein the heating cable terminals comprise first threaded male portions, the intermediate terminals comprise second male threaded portions, and the connectors comprise third female threaded portions.

9. A connection assembly as claimed in claim 8 wherein the third female threaded portions of the connectors comprise:

a first threaded section configured to engage the heating cable terminals, and a second reverse threaded section to engage the intermediate terminals.

10. A connection assembly as claimed in claim 1 further comprising one or more protective sheaths around the connectors and the heating cable terminals and the intermediate terminals.

11. A connection assembly as claimed in claim 1 further comprising one or more protective sleeves therearound after the heating cable terminals of the first and second heating cables are secured to the first and second intermediate terminals, respectively, to form the secured electrical pathways between the first and second trace heating cables.

12. A connection assembly as claimed in claim 1 wherein the outer sleeve extending from the first heating cable to the second heating cables encloses the connection assembly thereinbetween.

13. A connection assembly as claimed in claim 1 configured to provide electrical heating to the inner pipe across the join of the first and second PIP stalks.

14. A flexible intermediate connecting cable as defined in claim 1, and further comprising threaded connectors configured to secure the first and second intermediate terminals of the intermediate connecting cable to the heating cable terminals of the first and second trace heating cables, thereby forming the secured electrical pathway between the first and second trace heating cables.

15. A pipe-in-pipe (PIP) pipeline comprising two or more connected PIP stalks, each PIP stalk having at least one trace heating cable along its inner pipe, and a trace heating connection assembly as defined in claim 1 between the trace heating cables of each PIP stalk to form a secured electrical pathway between the trace heating cables and along the length of the inner pipe of the PIP pipeline.

16. A method of forming a pipe-in-pipe (PIP) trace heating connection in the annulus of a PIP pipeline comprising at least first and second conjoined PIP stalks having inner and outer pipes and the annulus thereinbetween, the first PIP stalk having a first trace heating cable located along its inner pipe, and the second PIP stalk having a second trace heating cable located along its inner pipe, the method comprising:

(i) providing heating cable terminals onto the ends of the first and second trace heating cables;

(ii) providing a flexible intermediate connecting cable having complementary intermediate terminals; and (iii) securing the heating cable terminals with the intermediate terminals to form a secured electrical pathway across the join of the inner pipes of the first and second PIP stalks between the first trace heating cable and the second trace heating cable;

exposing the ends of the first and second trace heating cables into individual core and braid cable ends by removal of heating cable insulation;

installing heating cable terminals with threaded portions onto the exposed cable ends and securing the heating cable terminals and cable ends together;

locating insulation between the heating cable terminals and the remainder of the trace heating cable insulation;

adding a protective cap around each cable ends leaving exposed the heating cable terminal threaded portions;

providing a flexible intermediate connecting cable having wholly or substantial the same length between the heating cable terminals of the first trace heating cable and the heating cable terminals of the second trace heating cable, said flexible intermediate connecting cable having cable terminals with threaded portions;

securing connectors having complementary threaded portions with the threaded portions of the heating cable terminals and the intermediate terminals;

rotating the connectors to further engage the threaded portions, and to draw together the heating cable terminals and the intermediate terminals towards each other; and providing a protective sleeve around the heating connection extending from the first trace heating cable to the second trace heating cable.

17. A method as claimed in claim 16 further comprising:
(i) providing the heating cable terminals with threaded portions;
(ii) providing the intermediate terminals with complementary threaded portions; and
(iii) securing the threaded portions of the heating cable terminals with the threaded portions of the intermediate terminals to form a secured electrical pathway between the first trace heating cable and the second trace heating cable.

18. A method as claimed in claim 17 wherein the flexible intermediate connecting cable comprises first and second intermediate terminals at each end of the cable, and comprising:

securing the connectors to the first and second intermediate terminals and the heating cable terminals and intermediate terminals, respectively, to form the secured electrical pathway between the first and second trace heating cables.

19. A method as claimed in claim 16 further comprising rendering taut the flexible intermediate connecting cable between the first and second trace heating cables.

\* \* \* \* \*